No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 1.

No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 3.

No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 7.

Fig. 7.

Witnesses
I. A. Pauberschmidt
N. E. Manning

Inventor
John H. Holland.
By Knight Bros
Attys.

No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 8.

Witnesses
Inventor
John H. Holland
By Knight Bros
Attys.

No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 9.

Fig. 9.

Witnesses
G. A. Pauberschmidt
N. E. Manning

Inventor
John H. Holland
By Knight Bros
Attys.

No. 717,994. PATENTED JAN. 6, 1903.
J. H. HOLLAND.
ELECTRIC CRANE.
APPLICATION FILED NOV. 19, 1901.
NO MODEL. 11 SHEETS—SHEET 10.

Witnesses
Inventor
John H. Holland
By Knight Bros
Atty's.

UNITED STATES PATENT OFFICE.

JOHN H. HOLLAND, OF COLUMBUS, OHIO, ASSIGNOR TO CASE MANUFACTURING COMPANY, OF COLUMBUS, OHIO, A CORPORATION OF OHIO.

ELECTRIC CRANE.

SPECIFICATION forming part of Letters Patent No. 717,994, dated January 6, 1903.

Application filed November 19, 1901. Serial No. 82,888. (No model.)

*To all whom it may concern:*

Be it known that I, JOHN H. HOLLAND, a citizen of the United States, and a resident of Columbus, in the county of Franklin and State of Ohio, have invented certain new and useful Improvements in Electric Traveling Cranes, of which the following is a specification.

My invention though adapted for general use is designed more especially for the difficult purpose of handling hot or cold ingots, in charging heating-pits, or taking ingots out of pits and placing them on roll-tables or in chairs ready for the rolls.

The object of the invention is to provide a crane employing chains capable of performing all required movements of whatever nature—such as traversing the bridge lengthwise of the building, traversing the trolley lengthwise of the bridge, hoisting and lowering the load, opening and closing the tongs, and turning or rotating the tongs to meet any angle at which it may be required to deposit the ingot in the pits or upon the roll-table—all these movements being reversible, the direction of each being governed by the operator. These objects are fully attained by certain novel principles and details of construction and arrangements and combinations of parts, that are hereinafter fully described, and the novel features of which are particularly pointed out in the claims, reference being had to the accompanying drawings, forming part of this specification, in which—

A represents the bridge, which is provided with end trucks B, mounting-wheels C, that run on rails D and receive rotary motion from a common bridge-motor E.

Figure 1:
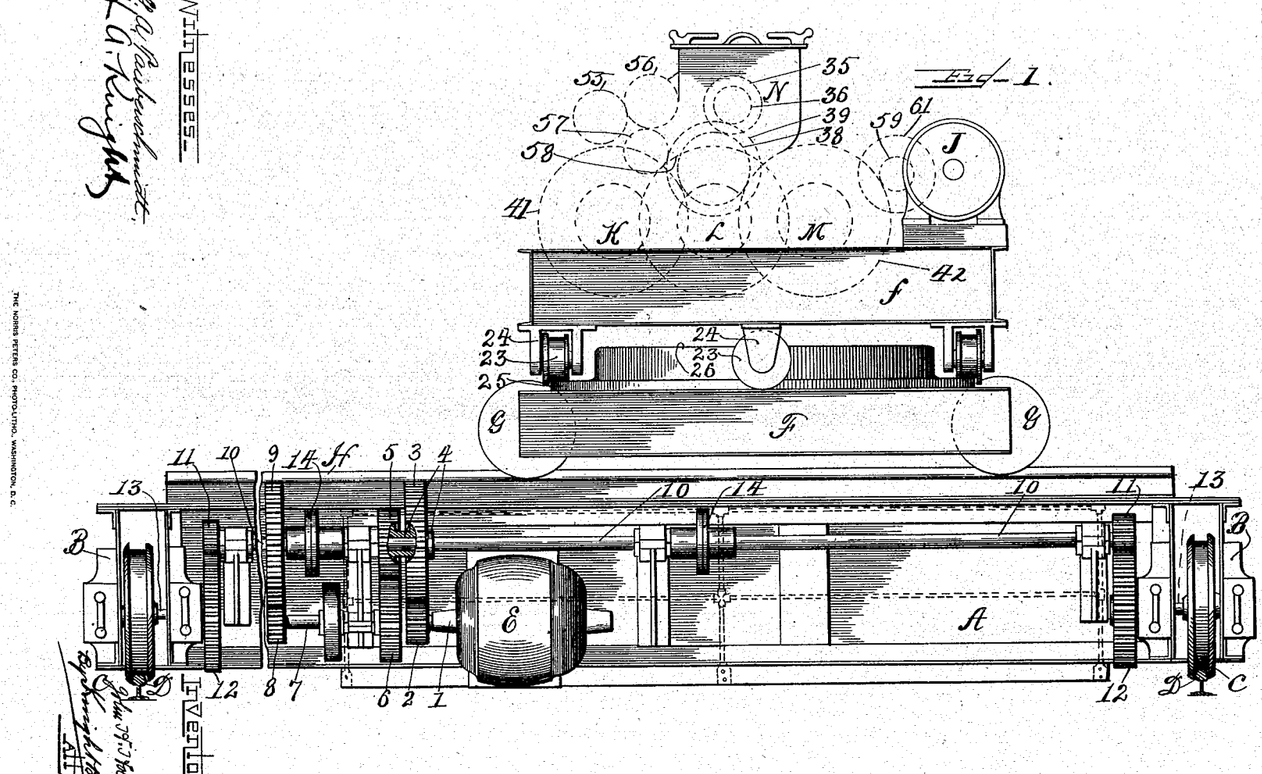
Figure 1 is a side elevation of opposite ends of the bridge with the intervening portion broken away, showing the traversing wheels, their actuating-motor, and the connections through which they are caused to revolve in unison; also, a side elevation of the two-part trolley which traverses the bridge, with the motor for winding the drums and the motor for rotating the upper portion of the trolley upon the lower. In this figure the upper portion of the trolley is rotated upon the lower ninety degrees from the relative position of these parts in some of the remaining figures showing the trolley.
Figure 2:
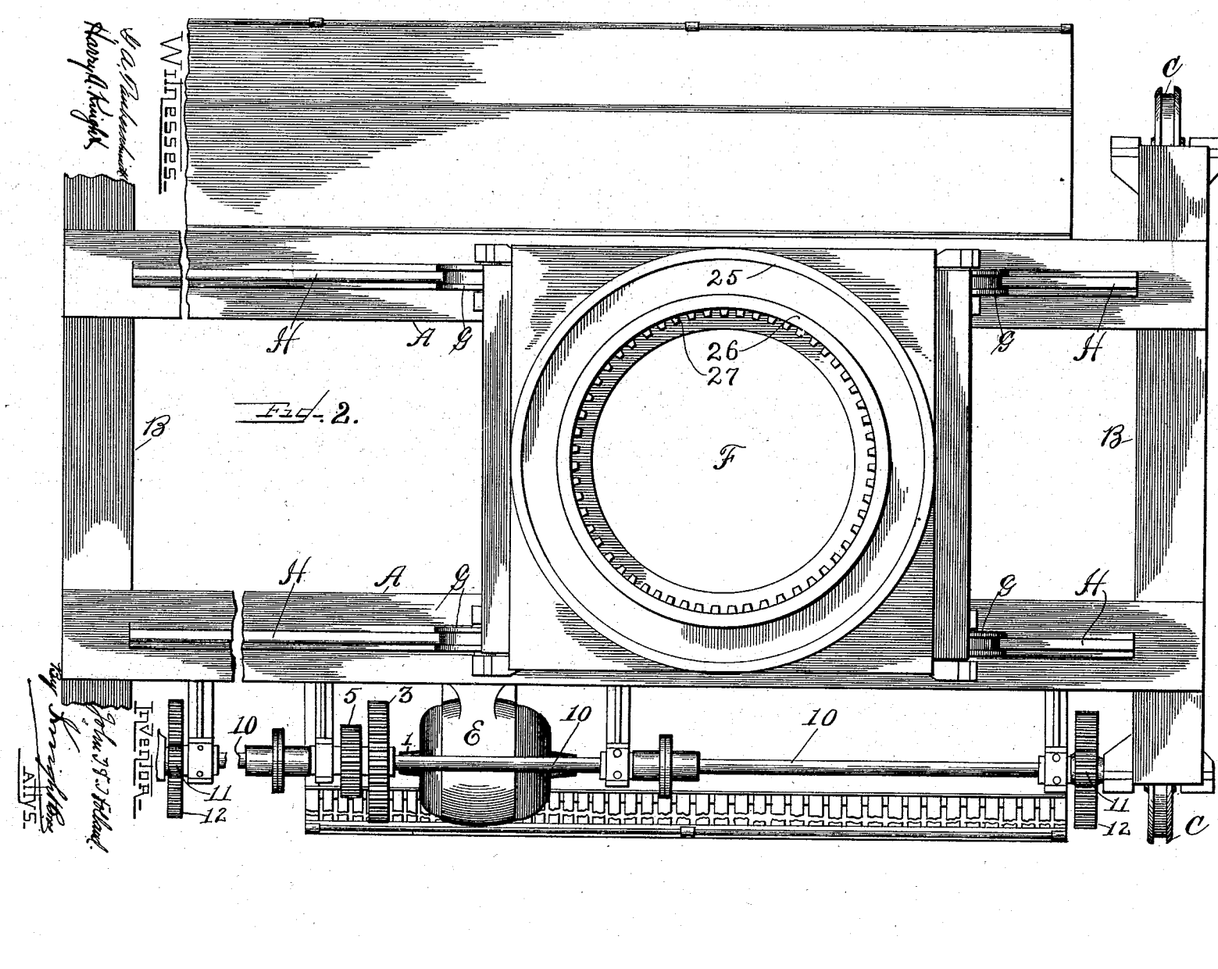
Fig. 2 is a plan of parts shown in Fig. 1, with the upper portion of the trolley removed and one of the two similar pairs of bridge - traversing wheels broken away.
Figure 3:
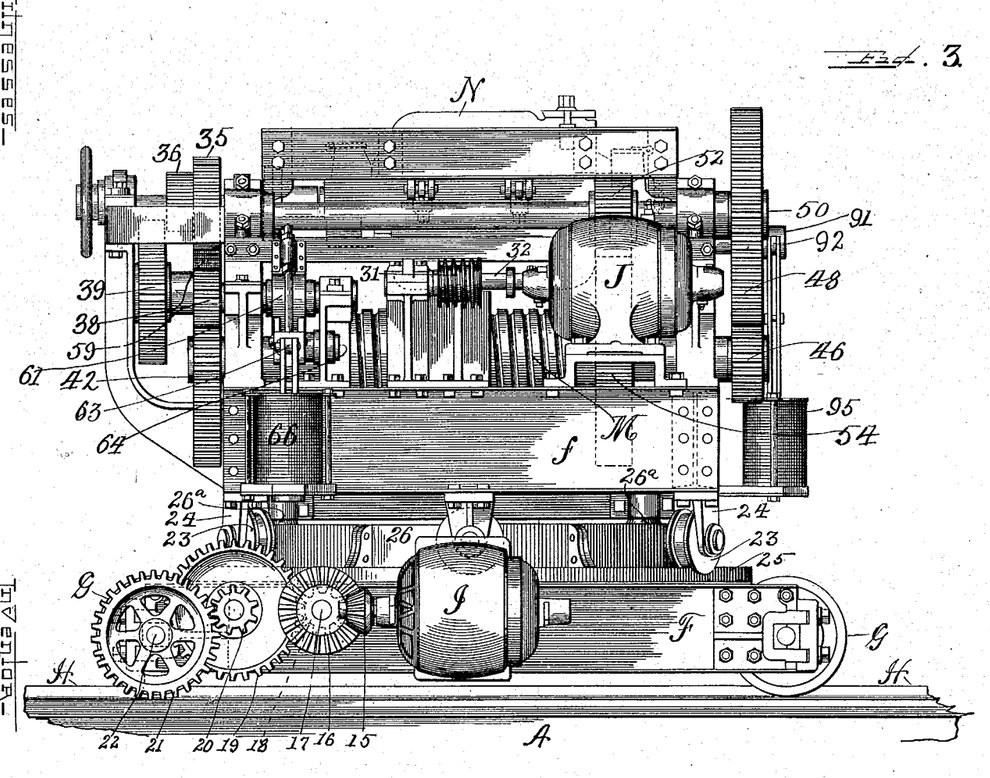
Fig. 3 is an elevation of that side of the trolley upon which are mounted the motors for driving and rotating it.

F represents the trolley, provided with wheels G, which run upon rails H upon the bridge and are driven by a trolley-motor I, Fig. 3, also with an upper rotating part *f*, carrying a turning-motor J, drums K L M, from which depends a system of six chains *k l m*, and a drum-winding motor N.

The traveling bridge may be of usual box-girder construction with its end trucks secured accurately in parallelism upon the rails.

*To traverse the bridge.*—In order to drive the wheels C at opposite ends of the bridge uniformly from the bridge-traversing motor E, and thus impart equal traveling movement to both ends of the bridge and keep it at all times normal to the track on which it runs, motion is transmitted from motor-shaft 1 through a pinion 2 to a gear-wheel 3, fixed on one end of a loose sleeve 4, thence through a pinion 5 to a gear-wheel 6, fixed on a short shaft 7, thence through pinion 8 on the other end of shaft 7 to a gear-wheel 9, fixed on the counter-shaft 10, extending from end to end of the bridge, and finally through pinions 11, fixed on opposite ends of the shaft 10, to gear-wheels 12, fixed upon the short shafts 13, which carry the wheels to be driven. 14 represents flange-couplings, which in addition to facilitating the assembling of the parts facilitate dividing the shaft 10 and procuring a relative rotation between its parts at any time to aline the bridge perpendicularly to the track.

*Traversing the trolley.*—Any suitable connections may be employed for transmitting rotation from the trolley-motor I to the wheels G. I have shown the bevel-pinion 15 meshing with the bevel gear-wheel 16 on shaft 17, which communicates rotation through reducing-gear 18, 19, 20, and 21, the last-named gear-wheel being fixed upon one of the trolley-axles 22, on which are also fixed one pair of the wheels G.

*Rotating the trolley.*—To render the upper portion *f* of the trolley readily rotatable upon the base of the trolley, the former is provided with a circular series of grooved rollers 23, mounted on radial axes in pedestals 24 and fitting a circular track 25 on the base F. A guard-flange 26 receives the rollers 26ª to prevent displacement of the rotatable portion of the trolley in the event of its derailment. Within the guard-flange 26 is a circular rack 27, Figs. 2, 4, 7, 8, 9, with which meshes a pinion 28 on the lower end of a vertical shaft 29, which carries at its upper end a worm-wheel 30, rotated by a worm-screw 31 on the shaft 32 of trolley-rotating motor J. Since the worm-wheel cannot drive the worm, the turning of the trolley and rotation or angular movement of the load may be controlled to the desired degree by simply regulating the duration of current-supply. There can be no racing of the parts.

*Hoisting.*—As previously stated, the hoisting is accomplished by winding chains *k m* upon the drums K and M. These drums with their chains can be best seen in Fig. 11. The drum L with its chains *l* do not support any important part of the load and merely serve to open and close the tongs by moving their fulcrum-plates upward or downward relatively to the tongs members. Except for the relative rotation between the drum L and the drums K and M the three drums rotate in unison, the drums K and M for the purpose of raising or lowering the load and the drum L to wind up or unwind the chains which serve to open and close the tongs. All of the drums are driven by the hoisting-motor N through connections which will now be described, the relative motion between the drum L and the drums K and M being caused by means to be hereinafter described in connection with the description of the control of the tongs.

Figure 6:
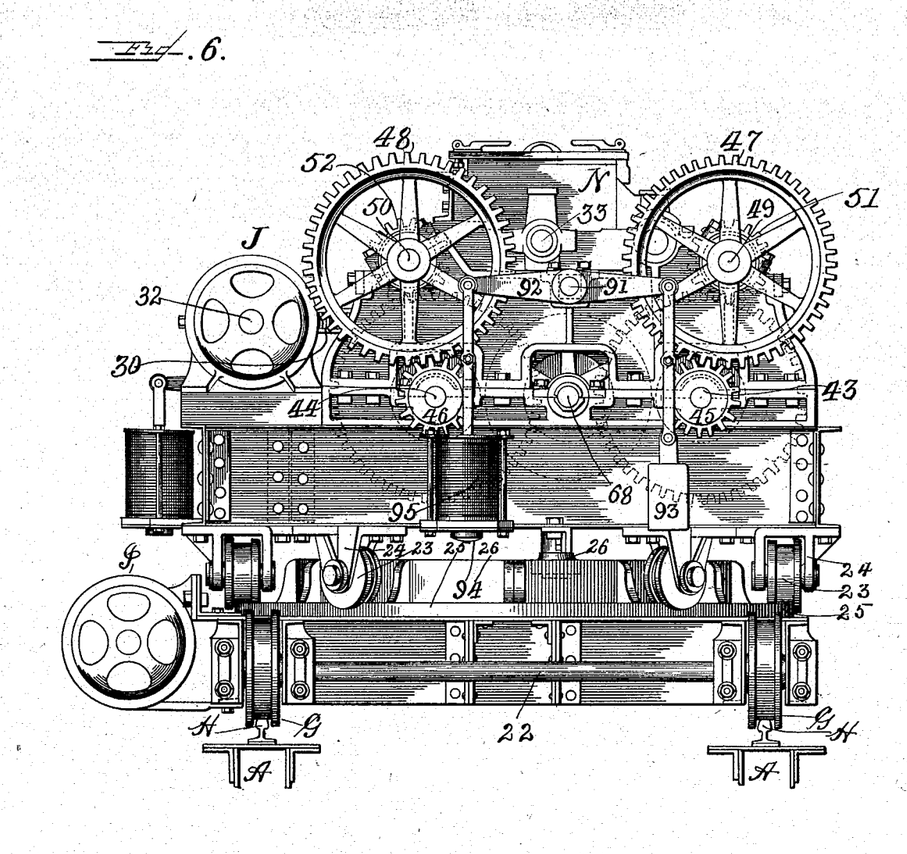

33 represents the winding-motor shaft, which is connected by a flange-coupling 34 with a short shaft, upon which are fixed large and small gear-wheels 35 and 36, capable of being shifted in an axial direction, so as to bring the larger wheel 35 into engagement with a wheel 38 or the smaller wheel 36 into engagement with a wheel 39. Both the wheels 38 and 39 are arranged to rotate in unison, the wheel 39 being keyed upon a sleeve extending integrally from the wheel 38. If the rotation of the motor-shaft 33 is imparted to the wheel 38 directly through the wheel 35, the wheel 38 receives a faster rotation than if it is driven indirectly through wheels 36 and 39. As the wheel 38 controls the rotation of the drums, means is thus provided for varying the rapidity of the hoisting and lowering movements. These parts can be readily seen in Fig. 9, in which the driving-motor is omitted from its shaft 33. By referring to Fig. 10 it will be seen that the wheel 38 meshes with two identical wheels 41 42, which are keyed to shafts 43 44, so that said shafts are rotated in the same direction—that is to say, with their adjacent faces moving in opposite directions. It will be seen in Fig. 7 that the shafts 43 44 project through but are not connected with the drums K and M, and they constitute the journals for said drums. The shafts carry on their opposite ends pinions 45 46, which, it will be seen upon reverting to Fig. 10, as also upon reference to Fig. 6, mesh with the relatively larger gear-wheels 47 48, keyed upon shafts 49 50, which extend across the trolley above the drums, Figs. 3 and 4. At intermediate points on the shafts 49 50 are keyed pinions 51 52, which mesh with gear-wheels 53 54 or toothed heads on the drums K and M. The drums are thus rotated by reduction-gear, which reduces the motion very greatly. This gear is partly on one end and partly on the other end of the drums and the connection between the parts in each case is a shaft that extends axially through the drum that is to be driven and upon which the drum finds its bearing. The parts being identical for each drum's driving connections, it follows that the drums will receive identical motion from the common source—the winding-motor N. The intermediate or tongs-controlling drum receives its driving motion from one of the shafts 49 or 50. In the present case it is shown connected with the shaft 49 through a pinion 55 on said shaft, that meshes with an idler or transmitting pinion 56, and through it drives a second idler 57, that reverses the direction of rotation and meshes with the toothed head 58 on the controlling-drum L and rotates the latter in the same direction as the drums K and M are rotated in and at the same rate of speed.

Figure 4:
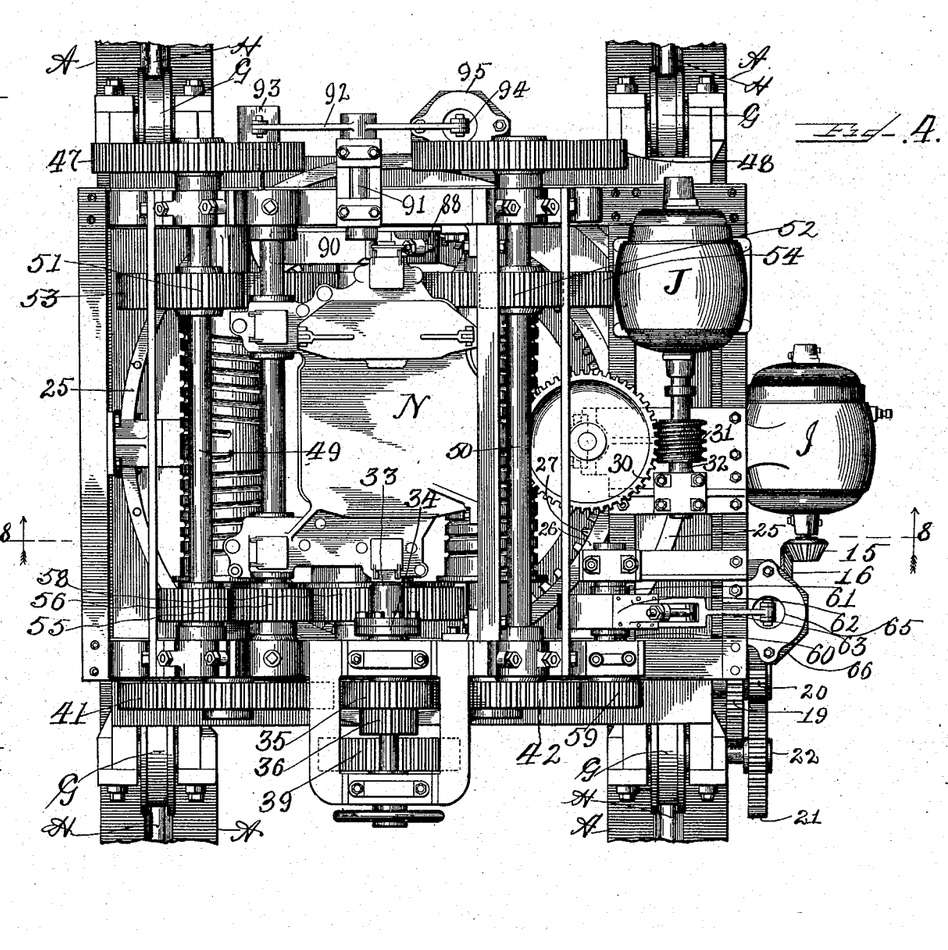
Fig. 4 is a plan of the trolley, showing the motor for winding the drums located in the center thereof and the motors for rotating and traversing it located, respectively, above and beyond one side thereof.
Figure 5:
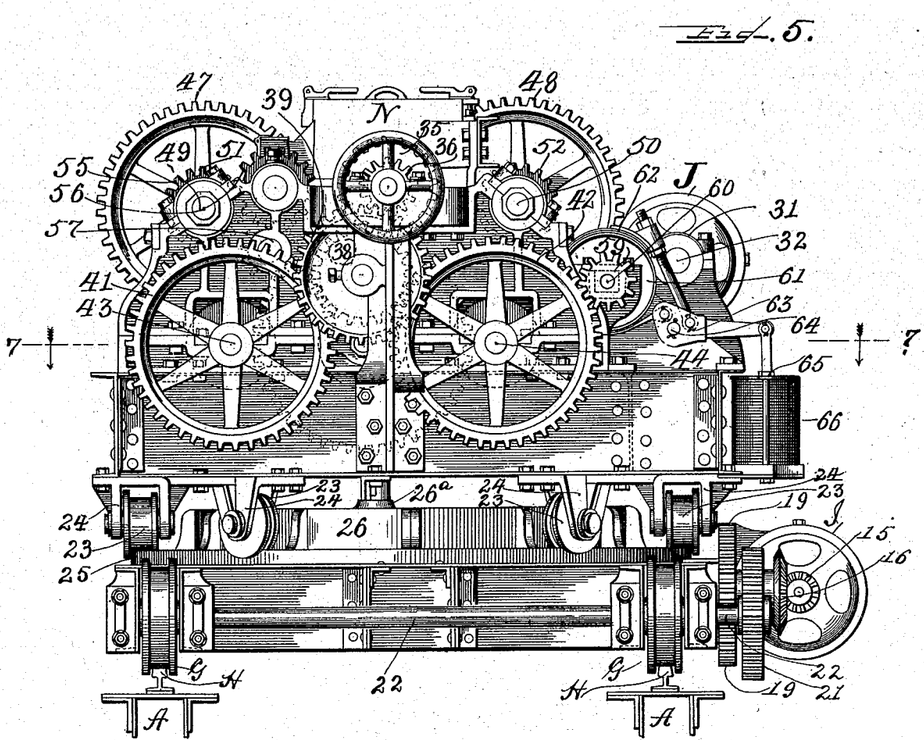
Figs. 5 and 6 are elevations of the ends of the trolley corresponding, respectively, to the bottom and top of Fig. 4 and to the left and right hand ends of Fig. 3.

59 represents a pinion meshing with the gear-wheel 42 on the shaft 44 and keyed to a short shaft 60, which carries a brake-wheel 61, to which is applied, as seen in Figs. 3, 4, and 5, a brake-band 62, connected with a controlling-lever 63, fulcrumed at 64 and carrying an armature 65 of a solenoid 66. These parts are constructed in a manner well known, having been used for many years in electric elevators and like apparatus. The solenoid 66 is either in shunt or direct electrical connection with the source of supply for the electric winding-motor N, so that when the motor is driven the solenoid is energized and raises its core to release the brake-band 62 and permit the parts to rotate freely; but when the motor is cut out the weight of the core or armature of the solenoid applies the brake and arrests the hoisting or lowering motion at once.

*Controlling the tongs.*—As already stated, the opening and closing of the tongs is controlled by changing the length of the opening-chains *l* on the drum L relatively to the hoisting-chains *k m* on the drums K M—that is to say, if the opening-chains *l* sustain the main weight of the tongs the latter will open, while if the weight of the tongs is merely sustained by the hoisting-chains the gripping-jaws will be drawn together and the tongs closed. This change in relative length of the chains must be accomplished by differentiating the rotation of the intermediate drum relatively to the two outer drums. Since the drums are driven from a common source of power, this differentiating is best accomplished by retarding the winding connections of one set of the chains relatively to the winding connections of the other, and for reasons of economy this feature is best embodied in the single intermediate drum. If the rotation of the intermediate drum be retarded while all the chains are being wound up or as the winding motion commences, obviously the opening-chains will not be wound as fast as the others, and will therefore be slackened and the hoisting-chains will have the effect of forcing the jaws together and gripping in the object over which they are suspended in gripping relation. If the intermediate or opening chain drum is retarded while the chains are being unwound, obviously the intermediate or opening chain will have shortened relatively to the hoisting-chains and will sustain the main load of the tongs while the outer hoisting-chains slacken and allow the upwardly projecting controlling-levers of the tongs to fall apart and open the tongs. By this motion the previously-gripped object will be released, or if the tongs are empty they will be opened ready to grip an object. Other motions—such as tilting ladles, operating clam-shell scoops, and such like—may be accomplished by these same changes in the relative lengths of the chains; but I will describe the means for accomplishing these changes in connection with tongs for handling steel ingots, it being understood that this association of these features of my invention is for the purpose of illustration and not of limitation.

The construction which admits of the above-described operation of the tongs will now be described.

Figure 9:
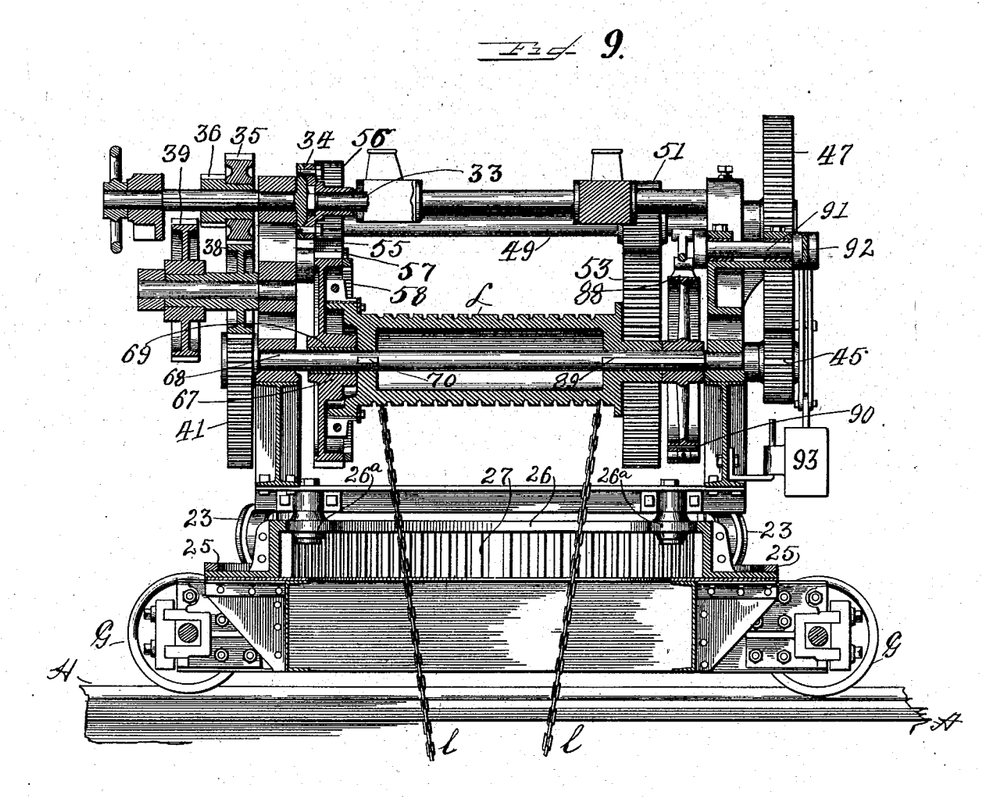
Fig. 9 is a vertical section through the trolley on the broken line 9 9, Fig. 8, and looking in the direction of the arrows in Fig. 8.
Figure 10:
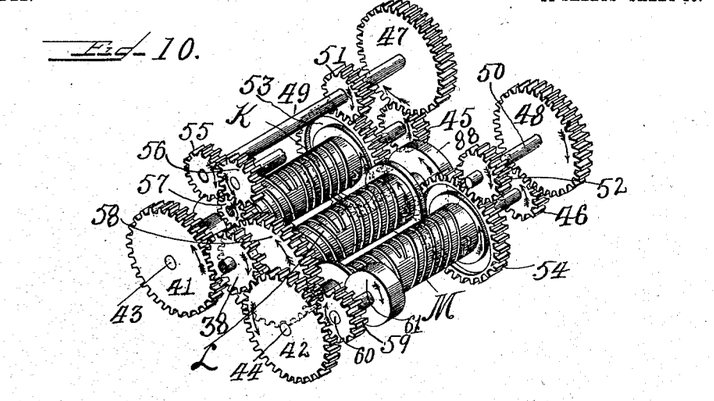
Fig. 10 is a perspective view of the three winding-drums and their gear, through which they are driven from a common motor.
Figure 11:
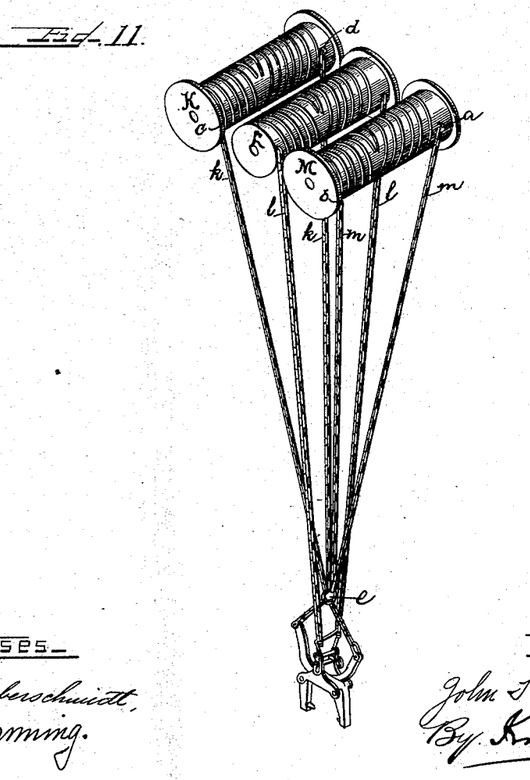
Fig. 11 is a perspective view showing the three winding-drums and their pyramidal construction of flexible winding connection, through which the load is forced to turn in unison with and prevented from turning independently of the rotating portion of the trolley or swinging in any direction.
Figures 12, 13, 14:
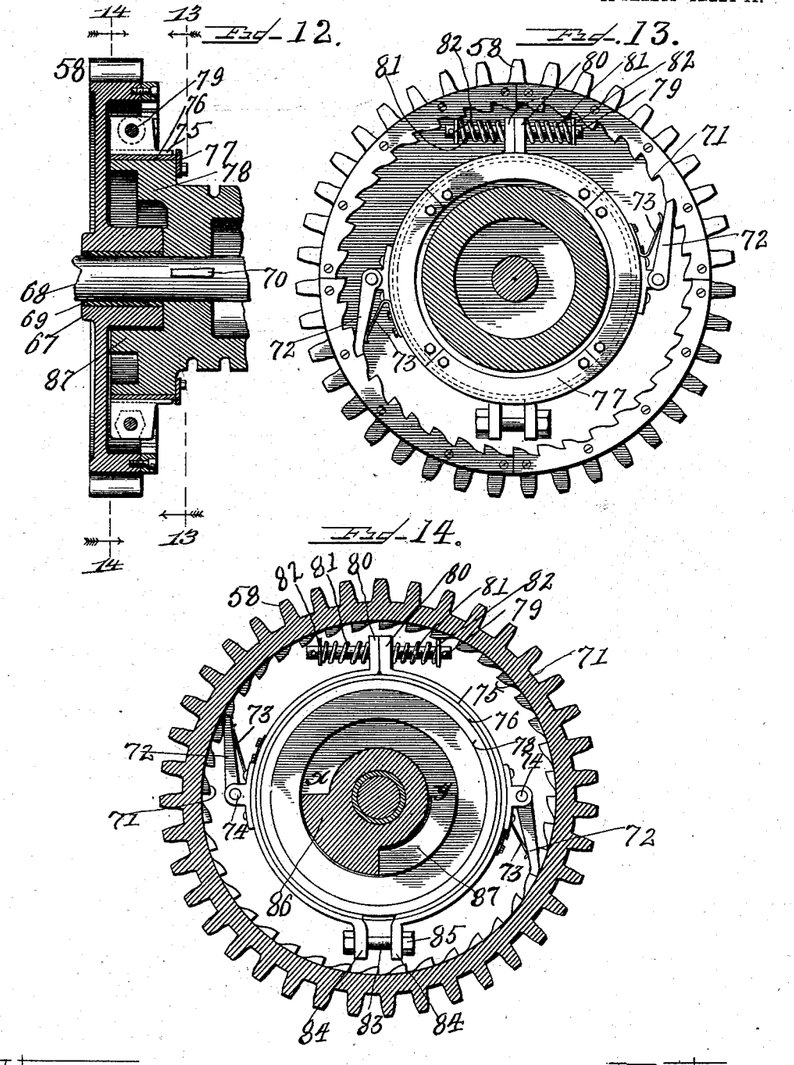
Figs. 12, 13, and 14 are sectional views of the releasing and pick-up clutch, which permits lost motion between the intermediate and the two end drums for opening and closing the tongs, Fig. 12 being a section taken vertically through the center of Figs. 13 and 14, Fig. 13 a section on the line 13 13, Fig. 12, looking in the direction of the arrow, and Fig. 14 being a section on the line 14 14, Fig. 12, looking in the direction of the arrow.

Referring to Figs. 9 to 14, it will be seen that the driving-gear 58 of the intermediate drum L is mounted through a hub 67 upon the shaft 68 of drum L, with an interposed bushing 69, said wheel 58 being thereby adapted to turn relatively to the shaft 68, while the drum is fixed upon said shaft by a key 70. (Figs. 9 and 12.) Driving connection between the wheel 58 and the drum L in the direction of winding is established through teeth 71 on the drum and pawls 72 pressed into engagement with said teeth by spring 73 and pivotally mounted in bearings 74 on a friction-strap 75, which bears through a leather facing 76, confined by an annular rim 77 upon a sheave 78, formed integral with and otherwise fixed upon the drum L. Wheel 58, which it has already been seen is positively driven at all times in unison with the hoisting-drums K and M, is thus brought into driving connection with drum L in the direction of winding through the friction-strap 76, which is in frictional driving connection with the sheave 78 on said drum. If the wheel 58 is rotated in the direction of unwinding the chains, it does not impart positive rotation to the drum, but permits such rotation which results from the weight of the chains hanging from the drum and limits the rate of said unwinding motion by the pawl-and-ratchet connection described. If same influence, for example, by means hereinafter described is brought to bear upon the drum to retard this rotation in the direction of unwinding, the ratchet connection permits the wheel 58 to continue, and the differentiation of rotation between the intermediate drum and the outer drums is thereby accomplished, with the consequent shortening of the opening-chain and the opening of the tongs. If while the drum is being wound up some influence is brought to bear to retard rotation of the drum L, no slip can take place in the pawl-and-ratchet connection; but this slip is provided for in the friction-strap connection 76, 77, and 78. To regulate the friction of strap 76, it is divided into two semicircular parts, which are connected at one end by a pin 79 passing through ears 80 on the parts of the strap and carrying springs 81, that are confined between said ears and shoulders 82 on the bolt in such a manner as to force the two ears 80 together, the opposite ends of the two parts of the friction-strap being connected by a bolt 83 passing through ears 84 and having an adjustment-nut 85. The ears 84 are spaced apart a suitable distance to permit adjustment of the nut 85. By forcing the ears 84 together the ears 80 are separated, the springs 81 compressed, and the pressure of the strap upon the sheave 78 is increased. Means is thus provided for regulating the friction between the strap 76 and the sheave 78 to a nicety. The degree of slipping motion of the wheel 58 and the drum L is limited by a radial stop 86, Fig. 14, on the hub 67, which engages the segmental lug 87 on the drum L. After a relative motion between the wheel 58 and the drum L (represented by the circumferential distance $xy$ in Fig. 14) has taken place in either direction further movement of the wheel 58 is positively imparted to the drum L by engagement of stop 86 with lug 87, and thereafter the drum L is compelled to rotate in unison with the drums K and M, while the difference in length of the chains established by the slip motion is maintained until the direction of the motor is reversed and the slip motion in the contrary direction is permitted.

In order to bring a retarding influence upon the drum L, and thus cause the slip motion referred to, I provide an electromagnetic brake that operates upon the wheel 88, Fig. 10, which is positively keyed by a spline 89 to the shaft 68, to which the drum L is keyed, Fig. 9. This electromagnetic brake comprises a brake-band 90, Figs. 4, 8, and 9, having its opposite end connected eccentrically to the torsion-shaft 91, which carries the lever 92, Fig. 6, from one end of which is suspended a weight 93, that turns the shaft 91 in a direction to clamp the brake-band 90 upon the wheel 88, and from the other end the core or armature 94 of a solenoid 95, which may be energized at will to rock the shaft 91 in opposition to the weight 93 and relieve the frictional contact of the brake-band 88. When the weight 93 is acting, the brake-band imposes such a load upon the drum L that it will cause the slipping or lost motion in said drum already referred to; but if the solenoid 95 is energized so as to rock the lever 92 in opposition to the weight 93 the brake-band 88 will be released and the drum L will be rotated without lost motion.

When the drums are rotating in the direction of winding up the chains, it has been seen that the pawl-and-ratchet connection between the wheel 58 and drum L cannot slide, but is positively engaged. The sliding which takes place in this direction must be in the friction device 76 77 78. The frictional contact at this point is just sufficient with a safe margin to perform the work of winding up the opening chain. If the retarding-brake 88 90 adds its retarding influence to the work which is being performed in winding up the chain, the load imposed upon the drum will be sufficient to cause slipping of the friction device 76 78. In unwinding the weight-load of depending chain on the drum L is assisting the rotation, and if the frictional driving connection 76 78 were employed it would be impracticable to retard the drum with the same brake that retards its rotation in winding up when rotation is imposed by the weight of the chain. For this reason the pawl-and-ratchet connection 72 73 is provided, and with this in use the retarding-brake simply has to brake the tendency of the drum to rotate under the weight of the chain, while the wheel 58 will continue in advance of the drum.

Figure 7:
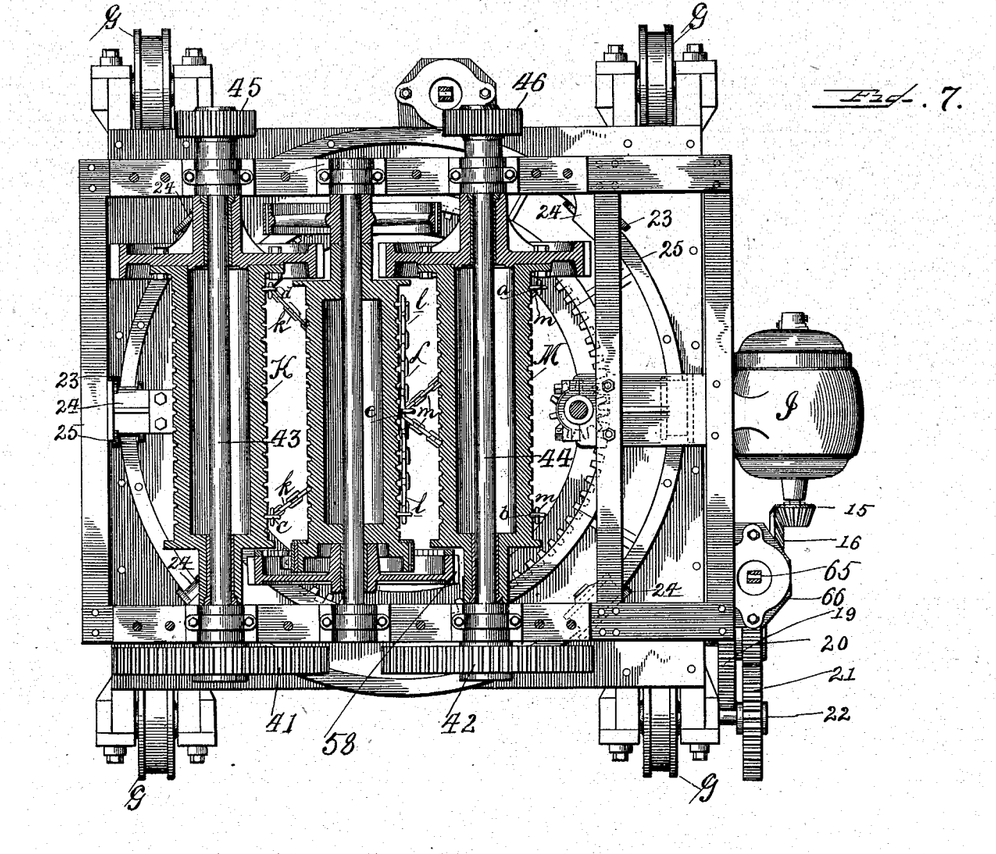
Fig. 7 is a horizontal section of the upper portion of the trolley through the axes of the winding - drums, the plane of section and the direction of view being indicated by the line and arrows 7 7 in Fig. 5.
Figure 8:
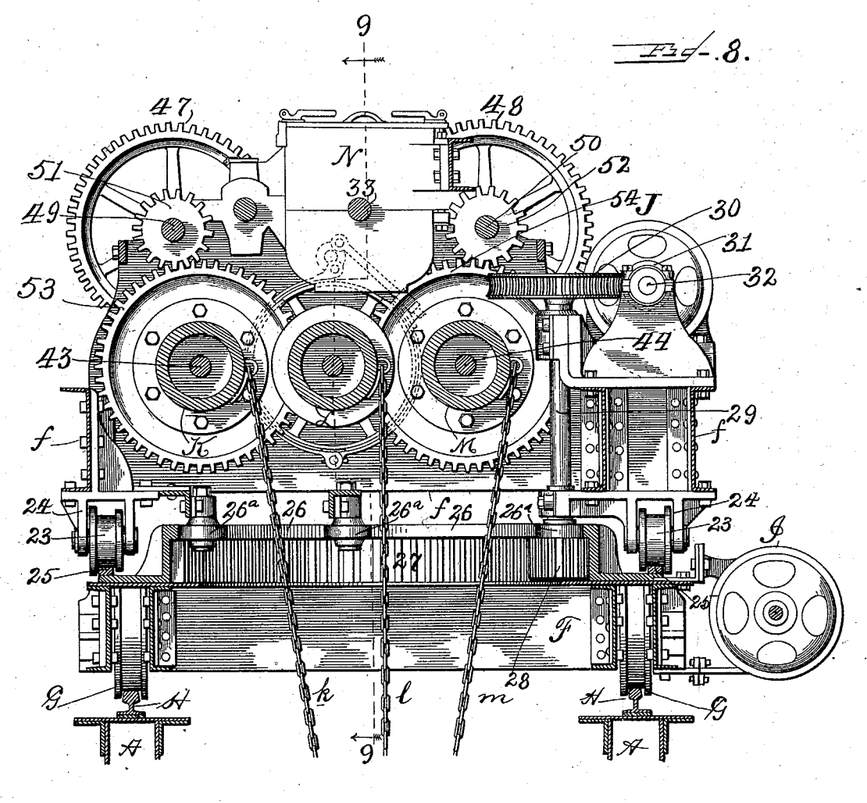
Fig. 8 is a vertical section through the trolley, taken on the line 8 8 and looking in the direction of the arrows in Fig. 4.

*Pyramidal chain system.*—The final feature of my invention is represented in Figs. 7, 8, 9, and 11, from which it will be seen that the six chains form an inverted pyramid, the base of which is represented by $a\ b\ c\ d$ and the apex by $e$ in Figs. 7 and 11. With this arrangement of chains it is impossible for the load to materially twist or swing, and it consequently remains vertically beneath the trolley, partakes of all the trolley's horizontal movements, and rotates with the trolley accurately. Thus it is possible to place an ingot accurately either in the heating-pit, where it is necessary to have the side of an ingot rest flat against the side of the pit, or to place ingots in different corners of the pit, so that they will not touch one another; also to convey the ingot to the chair at the rolling-table and place it accurately therein and to execute any movements with rapidity and precision. This is a most important novel result, since it has heretofore been impracticable to do this with cranes employing single hoisting-chains, or a system of chains arranged in one plane, without the assistance of several attendants using prods to prevent swinging and twisting of the ingot. Owing to difficulties heretofore experienced with chain cranes, they had prior to my invention been largely superseded by the use of the expensive plunger type of cranes, in which the support for raising and lowering the load and rotating it is a vertical piston or rack-bar which requires a superstructure or derrick above the trolley and an expensive inclosure affording large head-room.

The chains 11, depending from the intermediate drum and connecting with the fulcrum-blocks of the tongs, afford additional stability to the pyramidal suspended system, and these results obtain notwithstanding changes in the relative length of the chains, for changes in lengths of the chains cause opening and closing of the tongs, and the chains are always loaded with sufficient weight to insure stability.

Having thus described my invention, what I claim as new therein, and desire to secure by Letters Patent, is—

1. In combination with a traveling bridge, wheels upon which it travels and short shafts carrying said wheels; a counter-shaft extending the length of the bridge and having reducing-gear connection with each of said short shafts, an intermediate short shaft having reducing-gear connection with the counter-shaft, a sleeve supported by and turning on the counter-shaft, having at one end reducing-gear connection with the intermediate short shaft, an electric motor and reducing-gear connection between the shaft of said motor and the other end of the sleeve.

2. In combination with a traveling bridge, wheels upon which it travels and short shafts carrying said wheels; a counter-shaft extending the length of the bridge and having reducing-gear connection with each of said short shafts, an intermediate short shaft having reducing-gear connection with the counter-shaft, a sleeve supported by and turning on the counter-shaft, having at one end reducing-gear connection with the intermediate short shaft, an electric motor and reducing-gear connection between the shaft of said motor and the other end of the sleeve; said counter-shaft having a division and a flange-coupling therein on each side of the reduction-gear through which it is driven.

3. The combination of a lower non-rotating portion provided with central opening, a circular flange mounted on said portion around the central opening, and provided with a rack on its interior circumference and a guard-flange above the rack, an upper rotating portion, a pinion carried by the upper portion and meshing with the rack, and rollers also carried by the upper portion, bearing against the guard-flange preventing the displacement of the upper portion.

4. In a rotatable trolley for traveling cranes, the combination of the lower non-rotating portion having a circular track, a vertical annular flange within said track, projecting above it, an upper rotating portion having rollers running on the circular track with axes disposed radially to the trolley, and an electric motor having connections through which it rotates the upper portion of the trolley, comprising a circular rack on the face of the annular flange, a horizontal motor-shaft carrying a screw, and a vertical shaft carrying upon its upper end a worm-wheel meshing with said screw and upon its lower end a gear-wheel meshing with the circular rack.

5. In combination with the winding-drum of a traveling crane; an electric motor therefor and a train of reducing-gears between the motor and drum, embodying a shaft having a longitudinally-movable sleeve splined thereon, and carrying differential drive-gears, and a driven shaft, having two gears of different sizes fixed thereon, having their peripheries respectively in position to move into mesh with the different driving-pinions of the sleeve, and shiftable axially to bring either of them into mesh with its corresponding pinion.

6. In combination with the winding-drum of a traveling crane; an electric motor therefor and a train of reducing-gears between the motor and the drum, embodying a shaft connected with the motor-shaft, having longitudinally-movable differential driving gear-wheels splined thereon, and a driven member having two driven gear-wheels of different sizes fixed thereon, with their peripheries respectively in position to intermesh with the different driving gear-wheels when the latter are shifted axially to bring either of them into mesh with its corresponding driven gear-wheel.

7. In an electric crane, the combination of a single electric motor, a pair of hoisting-drums and identical driving connections between the motor and both drums embodying a common drive-pinion which receives motion from the motor, independent drum-shafts having at one end gear-wheels with both of which the drive-pinion meshes, passing through and turning within the drums, and having at their other ends transmitting gear-wheels, gear-wheels carried by the drums, and an electromagnetic brake for both drums comprising a brake-band wheel geared to one of the drums, a brake-band, a brake-band lever and a solenoid.

8. In an electric crane, the combination of a single electric motor, a pair of hoisting-drums and identical driving connections between the motor and both drums embodying a common drive-pinion which receives motion from the motor, independent drum-shafts having at one end gear-wheels with both of which the drive-pinion meshes, passing through and turning within the drums, and having at their other ends transmitting gear-wheels, gear-wheels carried by the drums, connections between each transmitting-gear and the gear on the drum, and a tongs-controlling drum also geared to and driven by the shaft of one of the transmitting-gears.

9. In an electric crane, the combination with a hoisting-drum, a tongs-controlling drum and a motor common to both drums, of a slip-joint having a limited movement introduced in the driving connections of one of said drums.

10. In an electric crane, the combination with a hoisting-drum, a tongs-controlling drum, and a motor common to both drums, of a slip-joint having a limited movement introduced in the driving connections of one of said drums, and a retarding-brake acting upon the drum having the slip-joint in its connections.

11. In an electric crane, the combination with a hoisting-drum, a tongs-controlling drum and a motor common to both drums; of a slip-joint introduced in the driving connections of one of said drums comprising a pawl-and-ratchet and a frictional driving connection.

12. In an electric crane, the combination with a hoisting-drum, a tongs-controlling drum, and a motor common to both drums, of a slip-joint introduced in the driving connections of one of said drums comprising a pawl-and-ratchet and a frictional driving connection, and a retarding-brake acting upon the drum having the slip-joint in its connections.

13. In an electric crane, the combination of a hoisting-chain drum, a controlling-chain drum, connections for driving the drums, a brake for one of the drums, and a slip-joint having a limited movement interposed in the driving connections for one of the drums.

14. In an electric crane, the combination of a hoisting-chain drum, a controlling-chain drum, connections for driving the drums, a brake for one of the drums, and a slip-joint having a limited movement interposed in the driving connections for one of the drums comprising a frictional device bearing against one part and engaged by the other.

15. In an electric crane, the combination of a hoisting-chain drum, a controlling-chain drum, connections for driving the drums, a brake for one of the drums, and a slip-joint interposed in the driving connection for one of the drums comprising a frictional strap surrounding one part and a pawl-and-ratchet connection between the friction-strap and the other part.

16. In an electric crane, the combination of a hoisting-chain drum, a controlling-chain drum, connections for driving the drums, a brake for one of the drums, and a slip-joint interposed in the driving connection for one of the drums comprising a frictional strap surrounding one part and a pawl-and-ratchet connection between the friction-strap and the other part engaging in the direction of winding but slipping in the direction of unwinding.

17. In a crane, the combination of a main and an auxiliary drum, a common driving power having driving connection with said drums, means permitting lost motion between said drums, comprising a yielding driving connection for one of the drums, and means to resist turning of said drum; the relation between the yielding driving connection and the resistance being varied, in the movement of said drum in opposite directions.

18. In a crane, the combination of a main and an auxiliary drum, a common driving power having driving connection with said drums, and a slip-joint permitting lost motion between said drums, and yielding more readily in one direction of rotation of the drums than in the other under means for imposing a resistance to the turning of one of the drums.

19. In a crane, the combination of a main and an auxiliary drum, a common driving power having driving connection with said drums, a slip-joint permitting lost motion between said drums, and yielding more readily in one direction of rotation of the drums than in the other, under a resistance imposed on one of the drums, and means for limiting the lost motion.

20. In a crane, the combination of main and auxiliary drums, a common driving power having driving connections with said drums, a slip-joint interposed in the driving connection of one of the drums, permitting lost motion between the drums, yielding under abnormal resistance offered by the drum which it drives, and overcoming greater resistance in one direction of rotation than in the other.

21. A crane having a hoisting-drum, a plurality of load-bearing chains attached to said drum at separated points thereon, and inclined downwardly toward each other, suitable carrying means supported at the lower ends of said chains, an additional hoisting-drum spaced apart from the hoisting-drum first named, and load-bearing chain connection between the carrying means and the second drum, inclined downwardly toward and connected at a common point with the first-mentioned load-bearing chains, and forming therewith a pyramidal system of hoisting-chains.

22. In a traveling crane, a system of four hoisting-chains in the form of an inverted pyramid the base of which is formed by the four points of attachment of the chains to the winding means.

23. In a traveling crane, the combination of a rotating trolley, a pair of hoisting-drums on the rotating trolley and a pair of hoisting-chains attached to each drum, at opposite ends thereof, and inclined inwardly and downwardly to the load-bearing connection, such as tongs and the like.

24. In a crane, the combination of a pair of hoisting-drums, a pair of chains attached to opposite ends of each hoisting-drum, and inclined to form an inverted pyramid and a controlling-chain drum also having a pair of chains secured to its opposite ends and inclined toward the apex of the pyramid.

The foregoing specification signed this 13th day of November, 1901.

JOHN H. HOLLAND.

In presence of—
R. B. BRYSON,
W. F. BILLINGSLEY.